Jan. 1, 1929.
J. H. WAGENHORST
1,697,440
VEHICLE WHEEL
Original Filed Aug. 9, 1920
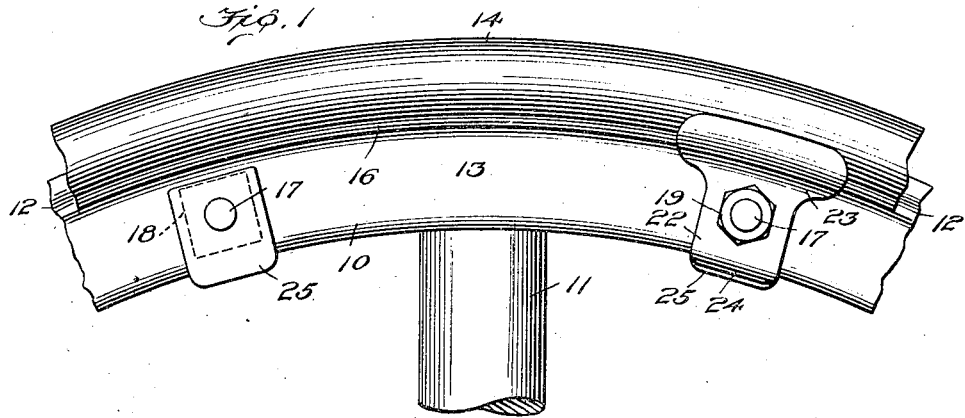
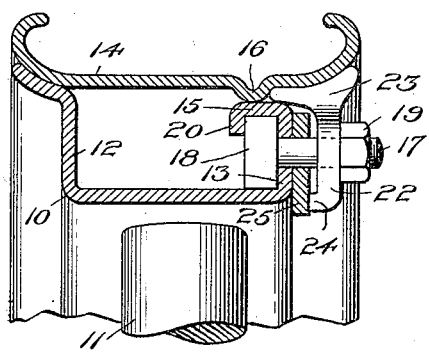
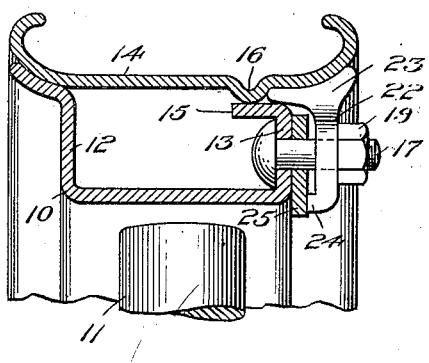
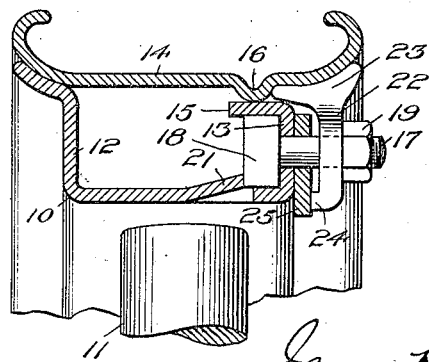
Inventor
James H. Wagenhorst
By
His Attorneys Patented Jan. 1, 1929.

1,697,440

UNITED STATES PATENT OFFICE.

JAMES H. WAGENHORST, OF JACKSON, MICHIGAN.

VEHICLE WHEEL.

Original application filed August 9, 1920, Serial No. 402,105. Divided and this application filed December 3, 1925. Serial No. 72,917.

This invention relates to improvements in vehicle wheels and particularly to that type of vehicle wheel having a felly on which is supported a demountable tire carrying rim. The primary object of the invention is to provide a form of connection between the felly of the wheel and the demountable tire, wherein there may be used a comparatively short bolt.

A further object of the invention is to secure the rim on the felly with a clamp which has a fulcrumed movement, such movement, as contrasted with a truly lateral movement of the clamp, being obtained by the provision of a fulcrum member on the exterior of the felly against which said clamp engages.

A still further object is to arrange the bolt on which the clamp is carried in such manner that it is securely held against lateral movement in the felly, whereby the threaded shank of said bolt will always project beyond the outer flange of the felly. This facilitates application of the clamps and nuts to the bolts.

These several features have heretofore been disclosed in applicant's co-pending application Serial No. 402,105 filed August 9, 1920 of which the present application is a division.

With these and other objects in view the invention consists in certain novel details of construction and combinations and arrangements of parts all as will hereinafter be more fully described and the novel features thereof particularly pointed out in the appended claims.

In the accompanying drawings,—

Figure 1 is a side elevation of a portion of a vehicle wheel embodying the present improvements;

Fig. 2 is a transverse sectional view of the structure shown in Fig. 1;

Fig. 3 is a like view showing a modification of the former structure;

Fig. 4 is another transverse sectional view showing a still further modification of the invention.

In accordance with usual practice the wheel comprises a sheet metal felly 10 mounted in any suitable way on the spokes 11, said felly being formed with front and rear legs 12, 13 on which there is adapted to be demountably secured the tire carrying rim 14. In the preferred construction the front leg 13 has a transversely disposed portion 15 against which an inrolled bead 16 formed on the tire carrying rim 14 engages.

As a matter of convenience and for the purpose of reducing the cost of production the bolt 17, on which is carried the clamp 22 for securing the rim on the felly, is made comparatively short and the head 18 thereof is located between the front and rear legs of the felly. In other words, the bolt does not extend entirely across the felly but extends through the clamp and one only of the legs, the protruding threaded end portion of the bolt receiving a nut 19 by means of which the clamp can be drawn up toward the felly to firmly secure the rim thereon. The head 18 of the bolt bears against the inner face of the front leg 13 and it is desirable that there should be some means for preventing the shank of the bolt moving rearwardly through the bolt receiving hole in the front leg. Preferably, this can be accomplished by turning the rim supporting flange 15 of the front leg 13 radially inwardly, as at 20, so as to overlie the bolt head 18. The same result may be obtained, however, in other ways. For instance, as shown in Fig. 4. a portion 21 of the base of the felly 10 may be punched radially outwardly so as to engage the bolt head. With either construction, the bolt is securely held in position in the bolt hole with its threaded shank portion extending outwardly beyond the felly in position to have the clamp and the nut applied thereto.

While it is not desired to limit the present invention to use with a clamp of any particular formation, it is desirable that the clamp 22 be formed with a head 23 which engages against the tire carrying rim and with a foot 24 capable of engaging against a fulcrum member carried by the felly 10, the fulcrum member in the present invention consisting of a washer 25 interposed between the clamp 22 and the outer face of front leg 13 against which it abuts. With a clamp of this type there is obtained a pivotal movement of the clamp when the same is being drawn up toward the felly for securing the rim on the rim supporting legs.

What I claim is:

1. The combination with a sheet metal felly having front and rear legs, of a demountable tire carrying rim, a clamp, a headed bolt carried by said felly and extending through said clamp, said front leg being bent toward the rear leg and then radially inward with the head of said bolt positioned between the front leg proper and the radial inwardly disposed portion thereof, and a nut on the outer end of said bolt.

2. The combination with a sheet metal felly having front and rear legs, of a demountable tire carrying rim, a clamp, a bolt extending through the front leg of said felly and the clamp, the head of said bolt engaging the inner face of said front leg and a portion of said front leg being turned over said head and behind it to hold it seated on the base of the felly and prevent longitudinal movement of the bolt, and a nut screwed on the end of the bolt and engaging said clamp.

JAMES H. WAGENHORST.